(12) United States Patent
Gurantz et al.

(10) Patent No.: US 7,594,249 B2
(45) Date of Patent: Sep. 22, 2009

(54) NETWORK INTERFACE DEVICE AND BROADBAND LOCAL AREA NETWORK USING COAXIAL CABLE

(75) Inventors: Itzhak Gurantz, San Diego, CA (US);
Ladd ElWardani, La Jolla, CA (US);
Anton Monk, San Diego, CA (US);
Brett Bernath, San Diego, CA (US);
Magnus Berggren, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 816 days.

(21) Appl. No.: 09/910,412

(22) Filed: Jul. 21, 2001

(65) Prior Publication Data

US 2002/0166124 A1     Nov. 7, 2002

Related U.S. Application Data

(60) Provisional application No. 60/288,967, filed on May 4, 2001.

(51) Int. Cl.
*H04N 7/18* (2006.01)

(52) U.S. Cl. ............................... 725/78; 725/51; 725/54; 725/74; 725/80; 725/85; 725/125; 725/119; 725/127

(58) Field of Classification Search .................. 725/51, 725/54, 80, 74, 78, 85, 125, 119, 127
See application file for complete search history.

(56) References Cited

U.S. PATENT DOCUMENTS

| | | | | |
|---|---|---|---|---|
| 4,222,066 A * | 9/1980 | Zelenz | ....................... | 380/208 |
| 4,633,309 A * | 12/1986 | Li et al. | ....................... | 380/242 |
| 4,864,613 A * | 9/1989 | Van Cleave | .................. | 380/220 |
| 4,933,745 A * | 6/1990 | O'Shea et al. | .............. | 257/724 |
| 5,726,701 A * | 3/1998 | Needham | .................... | 725/105 |
| 5,809,421 A * | 9/1998 | Manssen et al. | ............. | 455/434 |
| 5,969,582 A * | 10/1999 | Boesch et al. | ............... | 333/129 |
| 6,061,820 A * | 5/2000 | Nakakita et al. | ............ | 714/751 |
| 6,091,932 A * | 7/2000 | Langlais | ..................... | 725/111 |
| 6,144,399 A * | 11/2000 | Manchester et al. | ......... | 725/127 |
| 6,226,322 B1 * | 5/2001 | Mukherjee | ................... | 375/229 |
| 6,381,745 B1 * | 4/2002 | Paul | ............................ | 725/69 |
| 6,396,886 B1 * | 5/2002 | Kapoor | ....................... | 375/350 |
| 6,622,304 B1 * | 9/2003 | Carhart | ........................ | 725/74 |
| 6,771,706 B2 * | 8/2004 | Ling et al. | ................... | 375/267 |
| 6,778,601 B2 * | 8/2004 | Ise et al. | ..................... | 375/232 |
| 6,788,707 B1 * | 9/2004 | Horton et al. | ............... | 370/474 |
| 7,151,740 B2 * | 12/2006 | Zhang et al. | ................. | 370/208 |
| 2001/0021998 A1 * | 9/2001 | Margulis | ..................... | 725/81 |
| 2002/0069417 A1 * | 6/2002 | Kliger et al. | .................. | 725/78 |
| 2002/0088005 A1 * | 7/2002 | Wu et al. | ..................... | 725/129 |
| 2002/0145968 A1 * | 10/2002 | Zhang et al. | ................ | 370/206 |

* cited by examiner

*Primary Examiner*—John W Miller
*Assistant Examiner*—Sumaiya A Chowdhury
(74) *Attorney, Agent, or Firm*—Michael W. Landry; Bruce W. Greenhaus (57) ABSTRACT

A local area network uses coaxial cable wiring for interconnection of terminal devices. A frequency selective network interface device is placed at the building point of entry or another point in the wiring to reflect network signals transmitted by terminal devices back into the building distribution to be received by other terminal devices. By reflecting network upstream signals back into the building as downstream signals, the network interface provides a path for terminal devices to transmit to and receive from other terminal devices.

17 Claims, 5 Drawing Sheets

NETWORK INTERFACE DEVICE AND BROADBAND LOCAL AREA NETWORK USING COAXIAL CABLE

RELATED APPLICATIONS

This application claims the benefit of U.S. provisional application No. 60/288,967 filed May 4, 2001 entitled: Network interface and broadband local area network using coaxial cable.

TECHNICAL FIELD

This invention relates to broadband communication networks and specifically to network interface devices and network wiring.

BACKGROUND

Figure 1:
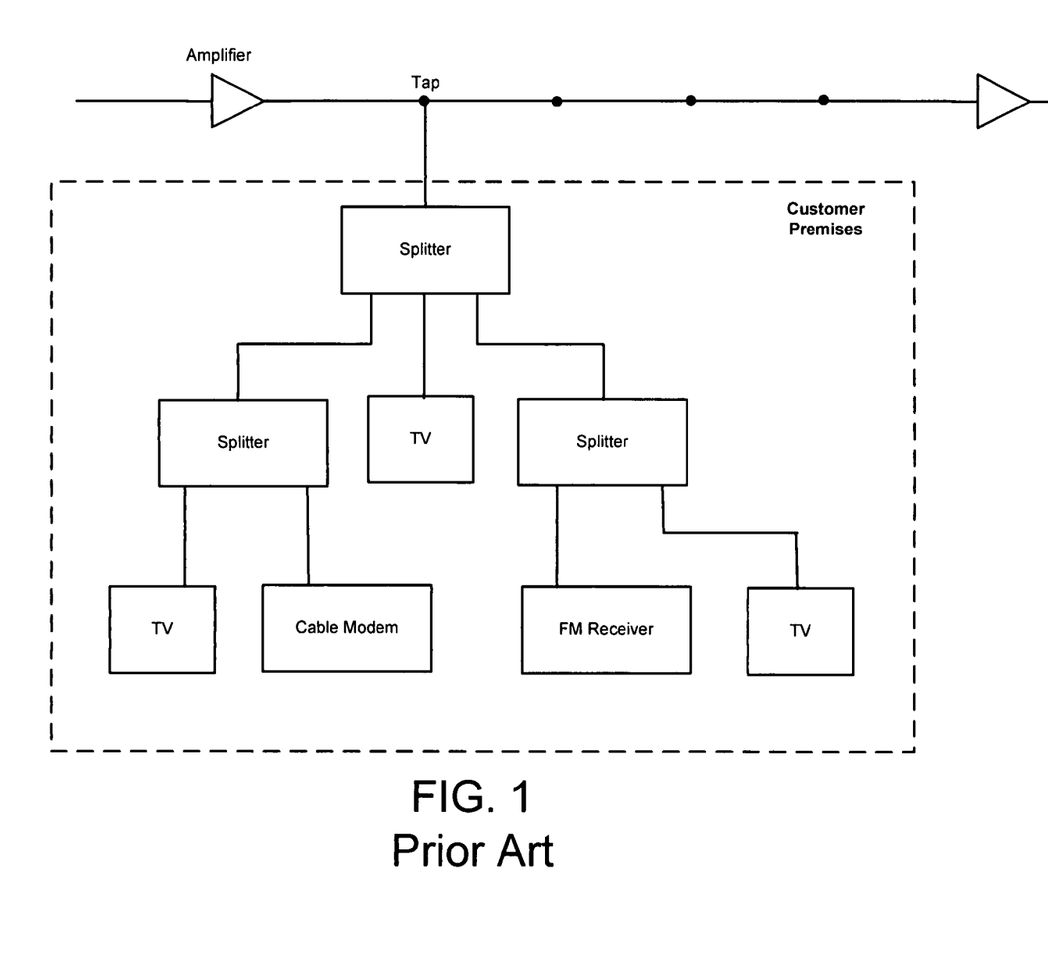
FIG. 1 is a diagram showing a prior art coaxial signal distribution plan.

In a coaxial cable based local area network (LAN), communication between nodes occurs over a shared coaxial cable. When the coaxial cable used for the LAN is shared with a community aerial television (CATV) or cable TV service the signals must be separated to avoid interference. The LAN signal can use one band of frequencies and the cable TV service can use a different band. A typical cable TV configuration for a home is shown in FIG. 1. Signal splitters are used to distribute downstream signals from the point of entry (POE) to the various terminals in the home, which can include cable converter boxes, televisions, and cable modems, generally referred to as customer premise equipment (CPE). Each terminal device may have the ability to transmit as well as receive. The upstream signal transmitted by the terminal device flows through the signal splitters back to the POE and to the cable plant. The signal splitters are functioning as signal combiners for upstream signals. Good quality splitters used in a properly wired system will provide a high level of isolation between terminal devices connected to the building wiring.

Figure 2:
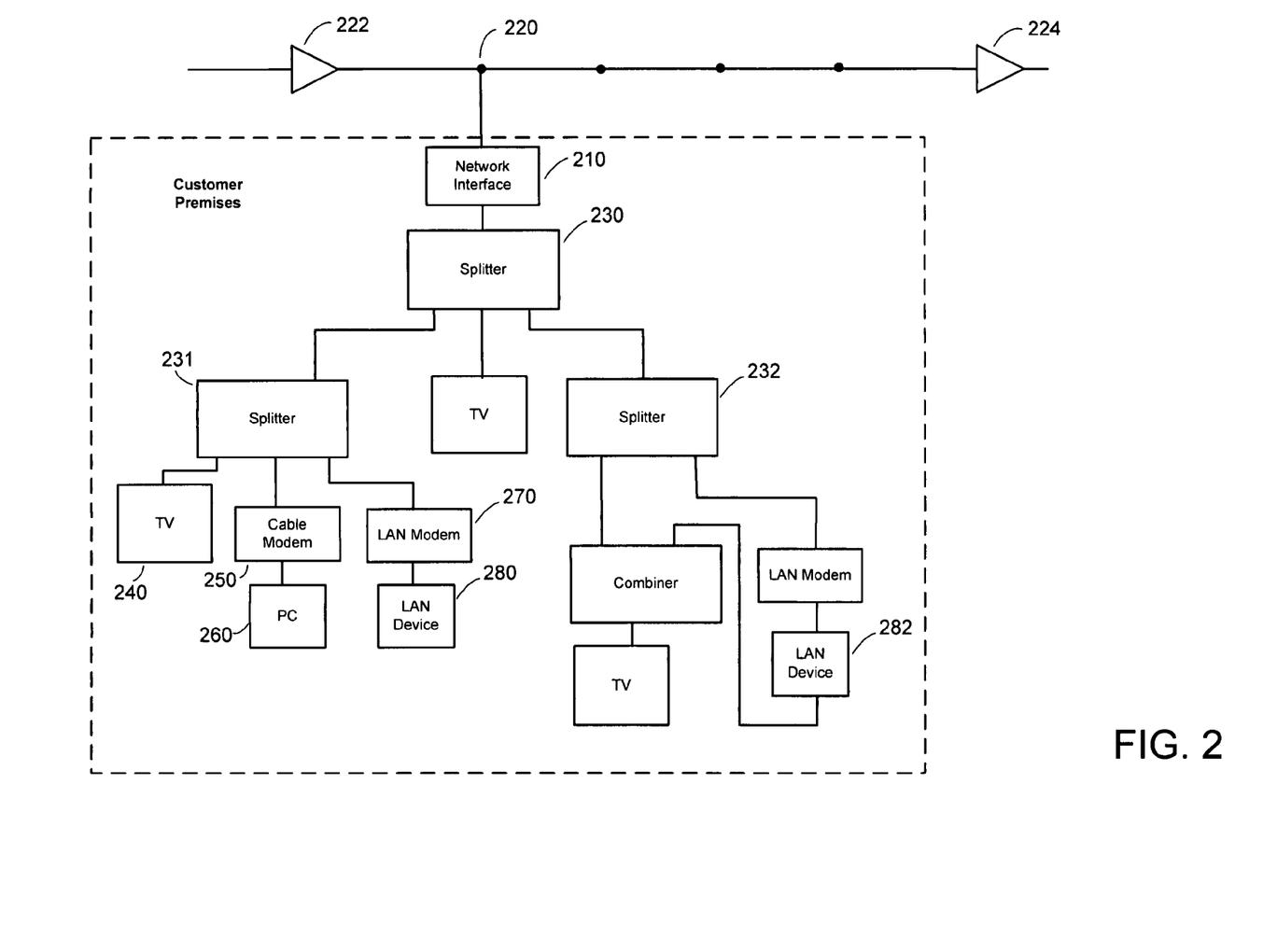
FIG. 2 is a diagram showing a signal distribution plan according to the present invention.

Signal splitters, shown in FIG. 2, are commonly used in home and other building type coaxial cable wiring. They have an input port and multiple output ports. The input port can also be considered a common port. The output ports can also be considered tap ports. Splitters are generally passive devices and can be constructed using lumped element circuits with discrete transformers, inductors, capacitors, and resistors. Splitters can also be constructed using strip line or microstrip circuits. A typical two-way splitter splits the power equally between the two output ports if each port is terminated equally. Thus each output would have a power level 3 dB lower than the input. Ideally, a splitter transfers all power from the input port to the output ports. In a practical implementation there is a modest power loss in the splitter due to impedance mismatches, non-zero resistances, dissipative losses in circuit elements, and other non-ideal properties. These losses amount to approximately 0.5 dB, thus a practical two-way splitter provides −3.5 dB power level to each output. A splitter may have 3 or more tap ports. There is typically an N-way splitter at the point of entry of a building.

Splitters are generally bi-directional; they can also function as signal combiners, which sum the power from multiple ports into a single output. The ports used as outputs in a splitter configuration become inputs ports for the combining configuration. The common port becomes the output port.

Splitters can be designed with power dividing ratios that are not equal. Instead of a 3 dB loss to each port, one port can have, for example 1.15 dB loss, and the other 6 dB. This corresponds to 75%/25% coupling. This type of splitter could be used to balance signal power at all terminal devices when there are multiple levels of signal splitters. A branch that terminates directly to a terminal device would be connected to a higher loss tap port. A branch that contains additional splitters would be connected to a lower loss tap port, which provides extra power to compensate for the loss of additional splitters.

Another characteristic of interest in signal splitters is the isolation between output ports. The isolation is typically between 10 dB and 40 dB. This isolation attenuates signals communicating between tap ports. The signal splitter/combiner is therefore directional, power flows to and from the common port to the tap ports, but power is attenuated between tap ports.

In a conventional cable TV or cable modem use, this isolation is of no concern because terminal devices do not communicate with each other, they only communicate through the POE with the cable head-end. In a LAN system, terminal devices communicate directly with each other, therefore attenuation between tap ports in the signal splitters results in an undesirable signal loss.

Another approach to the splitter inter-port isolation is to replace the main splitter at the building POE with a symmetric power splitter/combiner. In a symmetric splitter, power entering any port is divided among the other ports. A symmetric splitter/combiner is not directional. This type of splitter has 3 dB additional loss compared to a directional signal splitter. The additional loss is greater depending on the number of tap ports. A power amplifier may be required to boost the signal to compensate for this loss. A bi-directional device, such as a cable modem, requires a reverse path so the amplifier needs to be bi-directional. Another disadvantage to this approach is that installation is required; each coax connected to the existing N-way directional splitter must be disconnected and moved to the new splitter. Another disadvantage of this approach is that power must be available for the amplifier, which is not generally present in the area a typical main splitter is located.

The tap port isolation of splitters used in a typical cable TV distribution configuration presents a problem to shared usage of the cable for a LAN system.

Broadband networks are described in U.S. Pat. No. 5,889,765 Bi-directional communications Network issued to Gibbs, U.S. Pat. Nos. 5,940,387 and 6,005,861 Home Multimedia Network Architecture issued to Humpleman, U.S. Pat. No. 5,870,513 Bi-directional Cable Network with a Mixing Tap or Suppressing Undesirable Noise in Signals From a Remote End of the Network issued to Williams, U.S. Pat. No. 5,805,591 Subscriber Network Interface issued to Naboulsi, U.S. Pat. No. 6,008,368 Ethernet Transport Facility Over Digital Subscriber Lines issued to Rubinstain, U.S. Pat. No. 6,137,793 Reverse Path Multiplexer for Use in High Speed Data Transmissions issued to Gorman, and U.S. Pat. No. 6,091,932 Bidirectional Point to Multipoint Network Using Multicarrier Modulation issued to Langlais, each of which is incorporated herein by reference.

Gibbs disclosed a broadband network overlaid with the cable service frequencies using dynamically allocated TDMA protocols. Humpleman patents disclose a home network using an active network interface unit to couple the home network to the external network. Williams discloses a method of reducing noise accumulated in the frequency bands used by an upstream signal. Naboulsi discloses an active network interface for an asynchronous transfer mode (ATM) network. Rubinstain discloses a method of transporting Ethernet over twisted pair lines. Gorman discloses an active reverse path multiplexer for communication between the cable head-end and subscriber cable modems. Langlais discloses a two-way data transmission system for communicating between an upstream and downstream unit using OFDM. None of these references addresses the problem of tap port-to-port isolation and providing a suitable signal path for terminal-to-terminal communication in a coaxial cable wired building.

SUMMARY OF THE INVENTION

The present invention uses a frequency selective network interface device placed at the building point of entry (POE) to reflect upstream signals transmitted by terminal devices back into the building distribution whereby the signals may be received by other terminal devices. By reflecting upstream signals back into the building as downstream signals, the network interface device provides a path for terminal devices to transmit to and receive from other terminal devices. This overcomes the problem of port-to-port isolation in the signal splitter/combiners. A bidirectional signal distribution network is create from existing building wiring intended only for headend to terminal device communication. Another function of the network interface device is to isolate signals generated within the building and prevent the transmission outside the building. Due to the frequency selectivity of the network interface, upstream and downstream signals for cable TV and cable modem service are not disturbed. The network interface device can be implemented as a passive device. The network interface device can alternatively be an active device that derives power from the cable or an external power source.

The network interface device can be placed further into the customer premises, instead of at the POE. The network interface device is installed with a first port connected in the direction of the POE and a second port connected in the direction of the terminal devices. Installation of the network interface device produces a reflected signal in the direction of the terminal devices.

DETAILED DESCRIPTION OF THE INVENTION AND BEST MODE FOR CARRYING OUT THE INVENTION

Referring to FIG. 2, amplifiers 222 and 224 are part of the cable plant and provide a signal to the street and tap 220. A frequency selective network interface device 210 is located at the point of entry (POE) to the building LAN wiring. Alternatively, the frequency selective network interface can be located further inside the building, or at a point external to the building, for example at the street tap 220. The network interface 210 produces a reflection of upstream signals back into the LAN wiring so that terminal devices, such as LAN modem 270, can receive a signal transmitted by another terminal device connected to the LAN wiring forming the network. The invention intentionally introduces a reflection into the LAN wiring and exploits the reflected signal to provide communication path in a system that has high isolation between terminal devices due to splitters 230, 231, and 232 installed in the wiring. LAN modem 270 provides modulation and demodulation of the waveform transmitted over the cable. LAN modem 270 has an interface to communicate with a LAN device 280, which is the source or destination of data transmitted over the LAN. LAN device 280 can be, for example, a personal computer (PC). LAN device 282 can be, for example, a modulator to produce a signal for driving a TV through a signal combiner.

Existing devices, such as TV 240 and cable modem 250 connected to PC 260, use frequency bands distinct from the frequency band used by the LAN and therefore operate in a normal manner.

Figure 3:
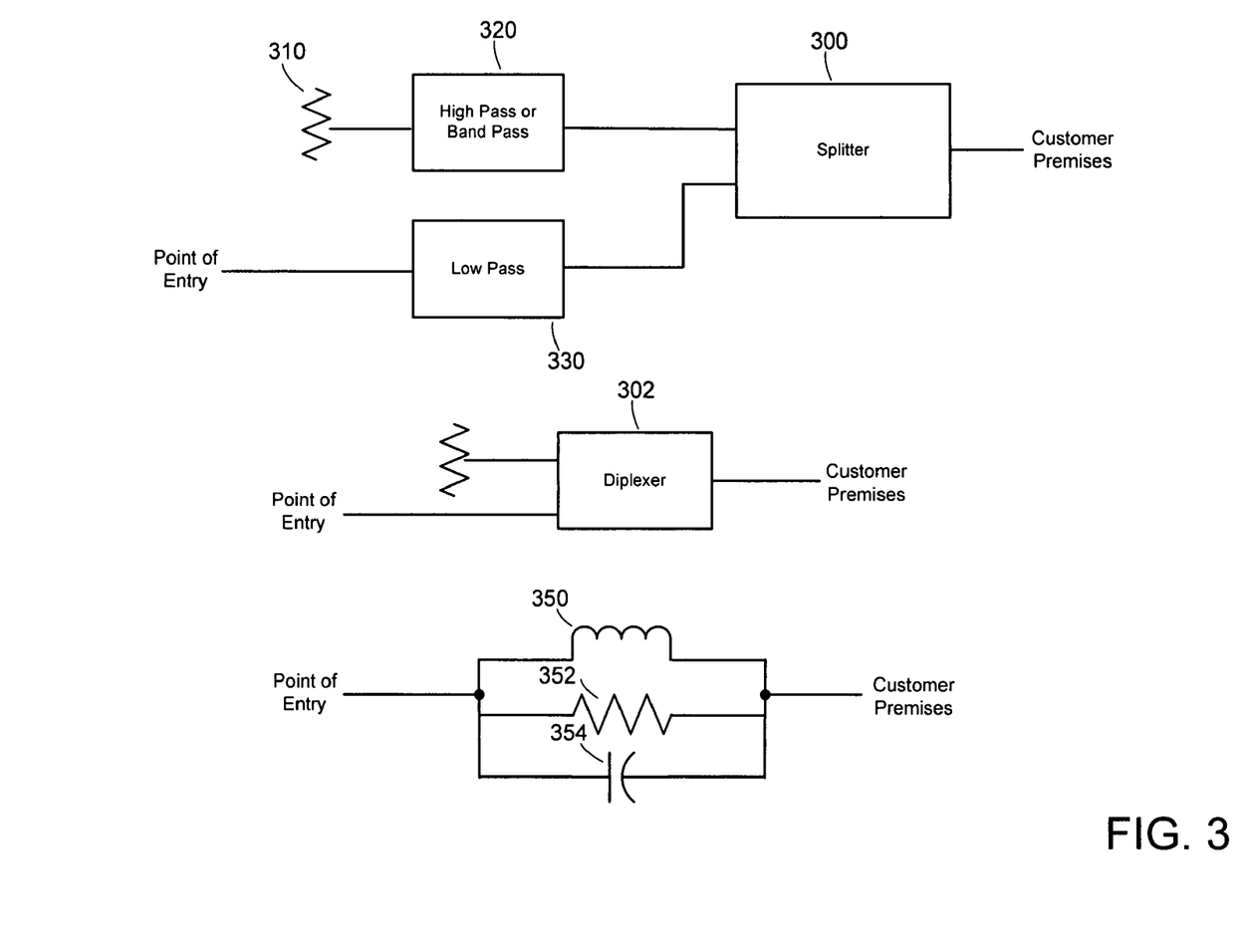
FIG. 3 shows embodiments of network interface devices in accordance with the present invention.
Figure 4:
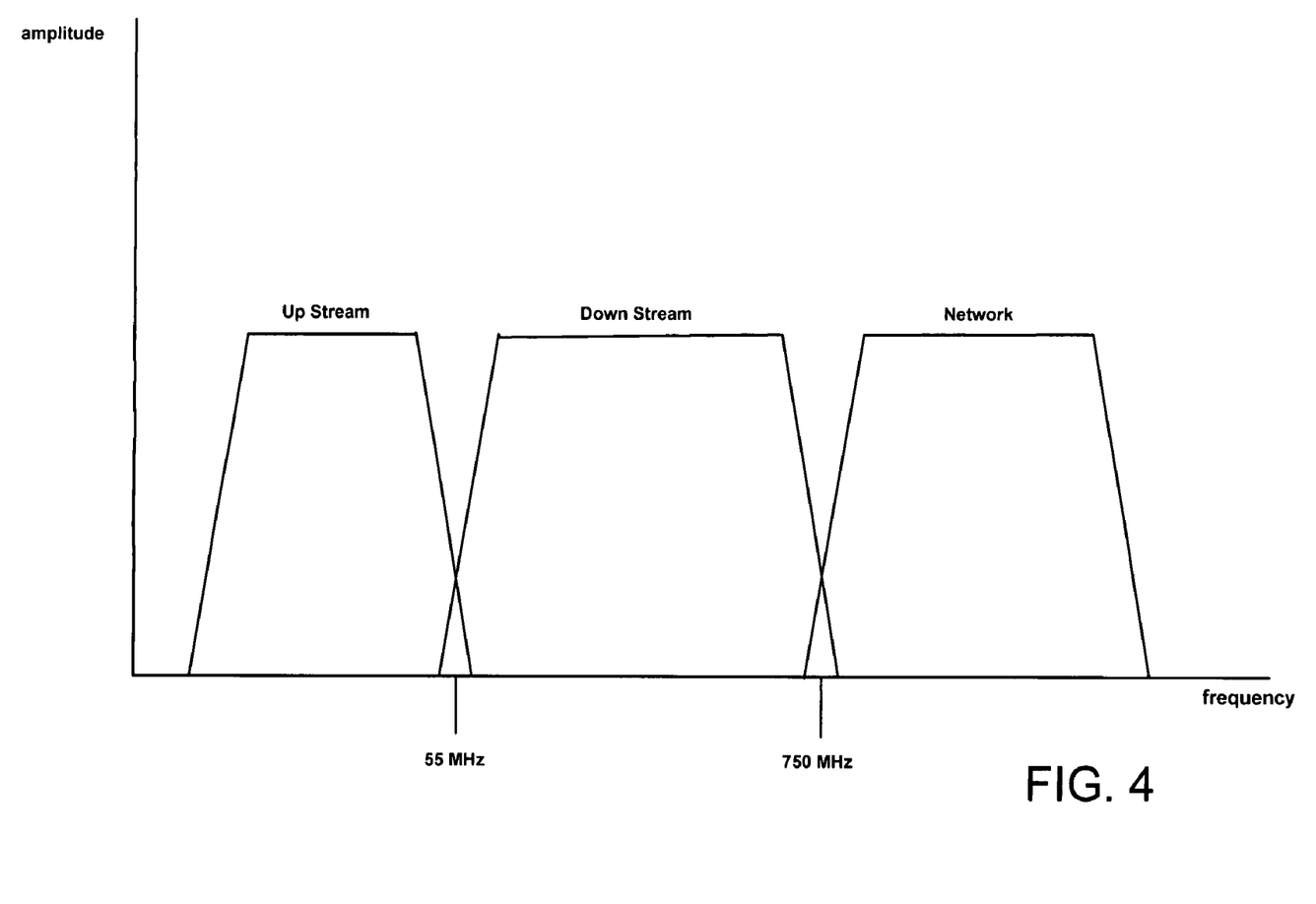
FIG. 4 shows a representative frequency allocation between cable service upstream/downstream signals and an overlaid local area network in accordance with the present invention.

Referring to FIG. 3, in one embodiment, the network interface device comprises a signal splitter 300 with an impedance mismatch 310 to create a reflected signal at one port, a frequency selective filter 320 coupled to the same port, and a frequency selective filter 330 coupled to a different port. The frequency selective filter 330 provides isolation of the building LAN signal from the cable plant and passes standard cable service signals through with minimal disturbance. This filter would typically be a low pass filter. Network signals at high frequencies originating in the building pass through the splitter and are blocked by filter 330. Filter 320 passes the network signal and mismatched termination 310 reflects the signal back through the splitter 300 to the building wiring. The signal is distributed through the building wiring to all nodes.

Impedance mismatch 310 functions as a signal reflecting element. An impedance matched termination will have an impedance equal to the characteristic impedance of the transmission line, the splitter port, or filter port to which the termination is connected. For example, 75 Ohms is the characteristic impedance of a typical RG59 or RG6 system. A 75 Ohm termination will not produce a reflected signal. Terminations different from a matched termination will produce a reflected signal. The magnitude of the reflected signal will be a function of the termination impedance relative to the characteristic impedance.

Impedance mismatch 310 can be implemented in a number of ways. A short circuit of approximately 0 Ohms attached to the signal line will produce a reflected wave of approximately equal magnitude to the incident wave with an inversion in the signal polarity. An open circuit, which is an impedance approaching infinite Ohms, will produce a reflected wave of approximately equal magnitude to the incident wave with the same signal polarity. Other impedances in between 0 and infinite Ohms may be used. The magnitude of the reflected signal will vary in relation to the degree of mismatch. The reflection coefficient will be $$(Z_1 - Z_0)/(Z_1 + Z_0),$$

where $Z_1$ is the termination impedance and $Z_0$ is the impedance of the port to which the termination is connected. See generally, *Microwave Circuit Design Using Linear and Nonlinear Techniques* by George D. Vendelin, et al, Wiley-Interscience Publication 1990, incorporated herein by reference.

Impedance mismatch 310 can also be implemented by introducing any impairment into an element, for example a cable, component, or connector, that changes the impedance of the element. Since impedance is determined by, among other factors, the cross sectional and longitudinal geometry of a transmission line, the impairment may be introduced by altering the geometry at one point or along a region of a transmission line. Impedance is also determined by the dielectric properties of the transmission line, so changing the dielectric at one point or in a region will also affect the impedance, creating a mismatch, and therefore a reflection.

Impedance mismatch 310 can also be implemented by altering the input or output impedance of the frequency selective filter used in the network interface device. The filter provides the termination at the point of connection, and therefore a mismatch will produce a reflection.

The level of reflection produced can be adapted to the needs of the system, based on, for example, the number of splitters in the building wiring or in a branch of the wiring, or the signal loss known to exist in the building wiring or in a branch of the wiring.

Splitters 300 and diplexer 302 are well known devices. Filters 320 and 330 can be constructed using lumped element inductors, capacitors, and resistors, using microstrip and strip line techniques, or using other active and passive filter implementations. The selection of components to produce a filter with particular frequency characteristics is done using well known filter design techniques, including the use of computer aided design (CAD) tools. Splitter 300 is designed to have a specific amount of coupling between the common port and the tap ports to create a desired level of signal reflection.

The frequencies used by the LAN can be located above the standard cable use frequencies, which extend to 550 MHz or 750 MHz. Other frequency plans can be used, for example where a block of frequencies is available in the middle of the cable band. The filter cut-off frequencies are selected according to the frequencies bands used.

Another embodiment of the network interface device uses a filter placed in between the POE and the customer premises. This filter can be implemented as a passive filter using an inductor 350, resistor 352, and capacitor 354. These filter components can be discrete components or formed using strip line or microstrip techniques. Inductor 350 resistor 352, and capacitor 354 determine the frequency response of the filter. In one embodiment, as shown in FIG. 3, the filter is a series notch filter that uses a parallel resonator. This filter presents an open condition to the series circuit at the resonance frequency, thereby reflecting the signal energy. The same filter can be implemented using a series resonator connected in a shunt configuration. In other embodiments, the filter can be a lowpass, highpass, or bandpass filter. More complex filter topologies may be employed for pass band shaping and impedance matching outside the filter notch frequency.

Filters with frequency characteristics determined primarily by reactive elements, such as highpass, bandpass, lowpass, and bandstop filters implemented with inductors and capacitors, have a different impedance value in the pass band and stop band. This property may be exploited in the present invention where the filter has approximately matched impedance in the frequency of the signals to pass through the filter and a mismatch in the frequency range where reflection of signals is desired.

Other techniques which can be used to implement the filters employed in the present invention include coaxial resonators, combline filters, interdigital filters, wave guide resonators, dielectric resonators, helical resonators, tubular bandpass filters, series resonators, parallel resonators, and other known filter techniques.

The present invention operates by introducing a reflection in the LAN electrical wiring. A reflection anywhere in the wiring produces a multipath signal in some or all wiring branches that creates inter-symbol interference (ISI). The multipath signal has a delay and amplitude difference relative to the main signal. In the frequency domain, a reflection produces ripples in the response of the channel, creating amplitude variations across the pass band. In the time domain, ISI is seen as an impairment to the shape of the digital signal pulses. ISI will degrade the bit error rate (BER) performance of the communication channel. The effects of ISI can be overcome by applying modulation techniques or receiver processing techniques. An adaptive equalizer in the terminal device receiver creates a filter response that restores a flat frequency response impaired by the multipath signal. The adaptive filter can also be seen as a coherent summer of a main signal and reflected signals.

Other methods of overcoming multipath effects include using multi-carrier techniques such as discrete multi-tone (DMT) or orthogonal frequency division multiplexing (OFDM). Another modulation technique that exploits the existence of a multipath signal is spread spectrum modulation such as direct sequence spread spectrum (DS-SS). A DS-SS receiver can employ a rake receiver in which each reflected path is received, demodulated, and coherently combined to produce a single data stream.

A variation of the DS-SS approach is to use code division multiplex (CDM), which uses data spreading of user data wherein a single user utilizes multiple spreading codes that are all transmitted on the same frequency band. User data is multiplexed between the several spreading codes to form multiple communication channels. A CDM receiver de-spreads each code and combines the data, typically into a single data stream.

A time domain equalizer (TEQ) or frequency domain equalizer (FEQ) can be used with any of the above described modulation techniques.

With any form of modulation, the present invention could use a time division duplex (TDD) protocol for communications. In a TDD system, the receive and transmit data are communicated during different time intervals, generally using the same frequency. The advantage of using TDD is that the transceiver design is simplified. Different users share a common frequency channel through the use of time division multiple access (TDMA). In a TDMA system each user transmits during a different time interval. Users are assigned one or more slots of predetermined length in a framing structure that contains multiple slots. All users are synchronized by a beacon message broadcast on the network. The beacon message provides a common time reference to the users and can include other network management information.

In an alternate embodiment of the invention, a signal coupling element may be introduced at one or more splitters in the building wiring. At each splitter junction, frequency selective coupling is created whereby the upstream signal at one splitter output port is coupled to other splitter output ports. Additionally, the LAN frequency band will couple through to the splitter input port. A conventional splitter can be replaced with a new splitter that has frequency selective inter-port coupling, or an additional device can be added to existing splitters to perform this function. Alternatively, a device added to a splitter in-line with the input connection and would produce a reflection in a manner similar to the network interface device placed at the POE. In this embodiment the interface device would be configured so a portion of the signal is reflected and a portion is passed through.

In another alternative embodiment of the invention, the main splitter can be constructed to introduce a reflecting circuit at each tap port along with some signal coupling between tap ports. This configuration allows some signal to reflect down the originating wiring branch to other devices in that branch and also couple to other wiring branches in the building.

Figure 5:
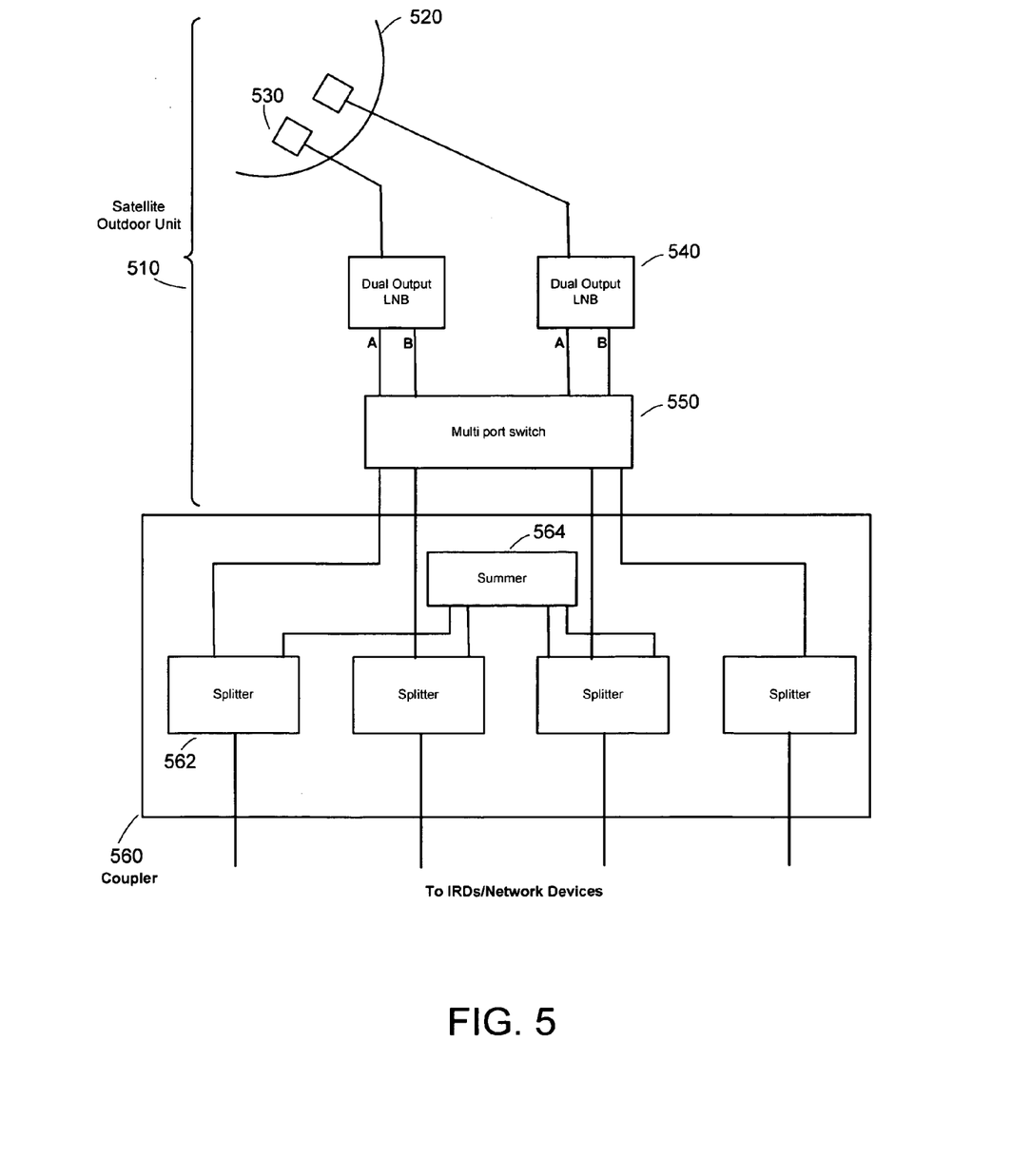
FIG. 5 shows a network using direct broadcast satellite wiring with a coupler according to the present invention.

In addition to coaxial wiring used for cable TV service, many homes and buildings are wired for satellite TV service. In another alternative embodiment of the present invention, a coupling path is provided to satellite television wiring system. Referring to FIG. 5, a satellite receiver outdoor unit 510 typically comprises a dish antenna 520, one or more low noise block-converters (LNB) 540, and a multiport crosspoint switch 550. The crosspoint switch 550 allows connection of the outdoor unit 510 to more than one integrated receiver decoder (IRD) located inside the building. The LNB 540 converts the signal transmitted by the satellite transponder, for example C band, Ku band or another frequency band, to a lower intermediate frequency (IF) suitable for transmission through coax. For example, L band IF (950 to 1450 MHZ) with RG6 coax cable is commonly used. The IRD demodulates the IF signal from the LNB down to baseband, provides channel selection, decodes the digital data to produce a video signal, provides conditionally access, and generates an RF output to drive a television.

According to the present invention, frequency or directional selective coupling is added after the LNB, for example in or after the crosspoint switch. This device provides coupling between coax cables connected to the outdoor unit. In this embodiment, the network signal would not use the same frequency band as the satellite signal. Referring to FIG. 5, conventional splitters 562, which have interport isolation, are used to couple the cable signals to a symmetric power summer 564. Conventional splitter 562 can be, for example, a 1.25 dB/6 dB splitter or some other ratio that provides an acceptable level of attenuation of the satellite signal wile providing an acceptable level of signal power for the network. The splitter may need to pass direct current (DC) to the LNB, which can be done by the inclusion of an inductor connecting the tap port to the common port. The L-band signal from the multiport switch 550 passes through the splitter and is combined with the signal output of the summer 564. Due to the directional nature of the splitter, which provides interport isolation, neither the summer signal nor the satellite signal passes through directly to the other tap port. A good quality splitter can achieve 20 dB or more of isolation between ports. Additional isolation between the satellite L-band signal and the network signals is achieved due to the non-overlapping frequency bands occupied by the respective signals.

According to the present invention, another implementation of the satellite system coupler uses frequency selective coupling to prevent interference with the L-band satellite signals. The frequency selective coupling, for example, comprises a low-pass filter to pass the band below L-band through the coupler. The coupling is provided by a symmetric combiner that distributes the energy from any port to the other ports.

In another alternative embodiment, summer 564 can be replaced with a directional splitter with an impedance mismatch connected to the common port. In this configuration, energy from each cable drop connected to an IRD is reflected back to the other cable drops.

Application of DMT and OFDM to the Present Invention

Multitone modulation uses a set of modulating carriers that are integer multiples of a common frequency and the symbol period is the inverse of the common frequency. Multitone modulation is also called discrete multitone (DMT) and orthogonal frequency division multiplexing (OFDM). OFDM utilizes quadrature phase shift keying (QPSK) and multi-level quadrature amplitude modulation (QAM) wherein each OFDM carrier can be modulated by an amplitude/phase varying signal. To modulate, data bits are encoded into a number of m-ary PSK constellations, which then modulate the respective carriers. The carriers are summed together for transmission over the channel. Each carrier is independent and can be independently decoded in the receiver.

OFDM provides a mechanism to overcome the frequency selective channel impairments present in coaxial building wiring when employing a network interface device according to the present invention.

QPSK is composed a sine and a cosine wave of identical frequency with phase modulation applied to each carrier independently. QAM is composed of sine and cosine waves with phase modulation and amplitude modulation. Both of these signals can be represented using complex numbers. The OFDM waveform is generated by applying an inverse discrete Fourier transform (IDFT) to a complex vector that results in a real valued time domain sequence. The time domain sequence is applied to an up converter to place the waveform at the proper RF frequency.

Higher SNR channels can support higher data capacity. Frequency bins occupying parts of the channel where the SNR is high can be used to transmit more bits. Each carrier may be modulated with a different order constellation, where higher SNR frequencies can bear a higher order constellation, and the resulting closer spacing of the constellation points. Frequencies with the lower SNR use lower order constellations such as QPSK.

The power in individual frequency bins can be adjusted to compensate for insertion loss that varies as a function of frequency. The power level in regions of the channel can be altered by scaling the complex valued vector for the bins where power adjustment is needed before applying the inverse Fourier transform. In order to avoid interference with certain bands in the RF spectrum, the power level of certain bins can be reduced to zero.

An OFDM receiver uses a discrete Fourier transform (DFT) to convert the modulated signal back into data. The OFDM receiver receives all the carriers at once and performs the transform on a block of data points. Drawing from terminology used in Fourier transforms, the frequency channels in OFDM may be called frequency bins or simply bins.

Various types of forward error correction can be applied to transmitted data blocks, such as Reed-Solomon and convolutional coding. Interleaving can be applied to data blocks to increase the robustness of the error correction. De-interleaving and error correction coding are applied in the receiver to recover the transmitted data without errors.

An OFDM receiver may also employ time domain equalization (TEQ), frequency domain equalization (FEQ), or both. Generally the equalizers are adaptive. Equalizers may be of the decision feedback (DFE) type or decision directed type such as least mean square (LMS) algorithm.

OFDM system architecture is covered in *ADSL/VDSL Principles* by DR. Dennis J. Rauchmayer, Macmillan Technical Publishing, 1999 and *DSL Simulation Techniques and Standards Development for Digital Subscriber Line Systems* by Dr. Walter Y. Chen, Macmillan Technology Publishing, 1998.

What is claimed is:
1. A signal distribution network comprising:
  a filter located at the point of entry of a building tuned to reject network signals originating in the building, such that the network signals originating in the building do not pass through the filter, but rather are reflected back into the building;

at least one signal splitter, the signal splitter having a common port and a plurality of tap ports, the common port of the signal splitter being coupled to the filter; and a plurality of terminal devices, each terminal device being coupled to a tap port of at least one signal splitter, at least one of the terminal devices providing frequency bins with more transmit bits which occupy parts of the channel where the signal to noise ratio (SNR) is high;

wherein the reflections from the filter provide a path for terminal devices back through the tap port of the signal splitter and out each other tap port to transmit signals to other terminal devices thus allowing terminal devices to communicate directly with each other to form the signal distribution network.

2. The signal distribution network of claim 1, wherein at least one of the communication channels between terminal devices uses time division duplex protocol for communications and the communications are synchronized by broadcasting a beacon message on the network.

3. The signal distribution network of claim 2, wherein the power level of each OFDM carrier is adjusted according to the signal loss at each OFDM carrier frequency to overcome frequency selective channel impairments caused by the reflections from the filter.

4. The signal distribution network of claim 1, wherein the signal modulation used by the terminal devices is orthogonal frequency division multiplexing (OFDM) and the modulation order of each OFDM carrier is adjusted according to the signal to noise ratio (SNR) at each OFDM carrier frequency to overcome frequency selective channel impairments caused by the reflections from the filter.

5. A broadband local area network using coaxial cable building wiring as a communication channel, the network comprising:

a plurality of terminal devices, each terminal device communicating with other terminal devices using orthogonal frequency division multiplexing (OFDM) modulation, at least one of the terminal devices providing frequency bins with more transmit bits which occupy parts of the channel where the signal to noise ratio (SNR) is high;

a network of building cables coupled to the plurality of terminal devices; and a filter having a first and second port, the first port connected to a building point of entry and the second port connected to the plurality of terminal devices via the network of building cables, wherein signals transmitted by any of the terminal devices and received at the second port of the filter are rejected by the filter such that such signals do not pass through the filter, but rather are reflected back into the network of building cables in order to create a communication path between the transmitting terminal device and at least one other terminal device coupled to the network of building cables.

6. The broadband local area network of claim 5 wherein the modulation order of each OFDM carrier is adjusted according to the signal to noise ratio (SNR) at each OFDM carrier frequency to overcome frequency selective channel impairments present in the coaxial building wiring caused by the reflections from the filter.

7. The broadband local area network of claim 5, wherein the power level of each OFDM carrier is adjusted according to the signal loss at each OFDM carrier frequency to overcome frequency selective channel impairments present in the coaxial building wiring caused by the reflections from the filter.

8. The broadband local area network of claim 5 wherein the frequency used for communicating is above the cable television band.

9. The broadband local area network of claim 5, wherein at least one of the communication channels between terminal devices uses time division duplex protocol for communications and the communications are synchronized by broadcasting a beacon message on the network.

10. A broadband local area network for transmitting modulated signals using coaxial cable building wiring containing a plurality of branches comprising:

a filter located at the point of entry of the building wiring that rejects network signals originating in the building wiring such that the rejected network signals do not pass through the filter, but rather are reflected by the filter back into all branches of the building wiring;

at least one signal splitter;

a plurality of terminal devices connected to the wiring branches, each terminal device capable of communicating with other terminal devices the reflected signal path created by the filter, wherein the terminal devices perform equalization on the received signal that restores a flat frequency response to overcome communication channel impairments caused by the reflected signals.

11. The network of claim 10 wherein the equalization is frequency domain equalization.

12. The network of claim 10 wherein the equalization is time domain equalization.

13. The network of claim 10 wherein the equalization is adaptive.

14. The network of claim 13 wherein the terminal devices use orthogonal frequency division multiplexing (OFDM) modulation to overcome the communication channel impairments caused by the reflected signals.

15. The network of claim 14 wherein the terminal devices use forward error correction to recover the transmitted signals without errors.

16. The network of claim 10 wherein the terminal devices use orthogonal frequency division multiplexing (OFDM) modulation to overcome the communication channel impairments caused by the reflected signals.

17. The broadband local area network of claim 10, wherein at least one of the communication channels between terminal devices uses time division duplex protocol for communications and the communications are synchronized by broadcasting a beacon message on the network.

* * * * *